(12) United States Patent
Haerle et al.

(10) Patent No.: US 7,993,420 B2
(45) Date of Patent: Aug. 9, 2011

(54) CERIA MATERIAL AND METHOD OF FORMING SAME

(75) Inventors: Andrew G. Haerle, Sutton, MA (US); Jun Wang, Shrewsbury, MA (US)

(73) Assignee: Saint-Gobain Ceramics & Plastics, Inc., Worcester, MA (US)

( * ) Notice: Subject to any disclaimer, the term of this patent is extended or adjusted under 35 U.S.C. 154(b) by 42 days.

(21) Appl. No.: 12/366,358

(22) Filed: Feb. 5, 2009

(65) Prior Publication Data

US 2009/0199488 A1 Aug. 13, 2009

Related U.S. Application Data

(60) Provisional application No. 61/028,005, filed on Feb. 12, 2008.

(51) Int. Cl.
*C09C 1/68* (2006.01)
*C09K 3/14* (2006.01)
*C01F 17/00* (2006.01)
(52) U.S. Cl. .............................. 51/309; 51/307; 423/263
(58) Field of Classification Search .................... 51/307, 51/309; 423/263
See application file for complete search history.

(56) References Cited

U.S. PATENT DOCUMENTS

| | | | |
|---|---|---|---|
| 5,938,837 A | 8/1999 | Hanawa et al. | |
| 6,120,571 A | 9/2000 | Aihara et al. | |
| 6,221,118 B1 | 4/2001 | Yoshida et al. | |
| 6,343,976 B1 | 2/2002 | Yoshida et al. | |
| 6,706,082 B2 | 3/2004 | Ota et al. | |
| 6,863,700 B2 | 3/2005 | Yoshida et al. | |
| 7,115,021 B2 | 10/2006 | Yoshida et al. | |
| 2002/0172827 A1 | 11/2002 | O'Connor et al. | |
| 2005/0252092 A1* | 11/2005 | Kim et al. | 51/307 |
| 2007/0254484 A1 | 11/2007 | Feng et al. | |
| 2008/0150184 A1* | 6/2008 | Chiruvolu et al. | 264/104 |
| 2010/0003897 A1* | 1/2010 | Kim et al. | 451/41 |

FOREIGN PATENT DOCUMENTS

| | | |
|---|---|---|
| JP | 03-793802 B2 | 4/2006 |
| KR | 10-2004-0074794 A | 8/2004 |
| KR | 10-2007-0025016 A | 3/2007 |

* cited by examiner

*Primary Examiner* — Elizabeth D Wood
(74) *Attorney, Agent, or Firm* — Abel Law Group, LLP (57) ABSTRACT

A particulate material comprising cerium oxide particles having a secondary particle size distribution in a range of 80 nm to 199 nm and a density of at least 6.6 g/cm$^3$.

11 Claims, 3 Drawing Sheets

CERIA MATERIAL AND METHOD OF FORMING SAME

CROSS-REFERENCE TO RELATED APPLICATION(S)

The present application claims priority from U.S. Provisional Patent Application No. 61/028,005, filed Feb. 12, 2008, entitled "Ceria Material and Method of Forming Same," naming inventors Andrew G. Haerle and Jun Wang, which application is incorporated by reference herein in its entirety.

FIELD OF THE DISCLOSURE

This disclosure, in general, relates to ceria materials and methods and systems for forming ceria materials.

BACKGROUND

Abrasive materials are used in various industries to remove bulk material or to affect surface characteristics of products, such as shine, texture, and uniformity. For example, manufacturers of metal components use abrasives to refine and polish surfaces to a uniformly smooth surface. Similarly, optics manufacturers use abrasive materials to produce defect-free surfaces that prevent unwanted light diffraction and scattering. In addition, semiconductor manufacturers may polish substrate materials to produce low defect surfaces for formation of circuit components.

Manufacturers typically desire abrasive materials that have a high stock removal rate for certain applications. However, there is often a trade-off between removal rate and quality of polished surfaces. Finer grain abrasive materials typically produce smoother surfaces but can have lower material removal rates. Lower material removal rates lead to slower production and increased cost. On the other hand, larger grain abrasive materials have higher material removal rates but can contribute to scratches, pits and other deformations in polished surfaces.

Cerium (IV) oxide, or ceria, is a ceramic particulate used in the polishing of $SiO_2$-based compositions. Generally, ceria removes $SiO_2$ during polishing by mechanical means. Further, its chemical activity with respect to the $SiO_2$ improves the removal rate when compared with other materials. In order to use ceria-based particles in electronic applications, such as semiconductor chemical-mechanical polishing (CMP), photomask polishing, or hard disk polishing, the particles should be sufficiently abrasive to polish at a high rate without causing scratches, pits or other deformations in the polished surface and further, should be free of contaminants. Such defects and contaminants increase in significance as device manufacturing technologies continue to reduce the feature size.

As such, an improved abrasive particulate and abrasive slurries formed thereof would be desirable.

SUMMARY

In a particular embodiment, a particulate material includes cerium oxide particles having a primary particle size in a range of approximately 70 nm to approximately 120 nm and a secondary particle size distribution in a range of approximately 80 nm to approximately 150 nm.

In another embodiment, a particulate material includes cerium oxide particles having a primary particle size in a range of approximately 70 nm to approximately 120 nm and a density of at least approximately 6.6 g/cm$^3$.

In a further embodiment, a particulate material includes cerium oxide particles having a secondary particle size distribution in a range of approximately 80 nm to approximately 199 nm and a density of at least approximately 6.6 g/cm$^3$.

In an additional embodiment, an abrasive slurry includes a particulate material. The particulate material includes cerium oxide particles having a secondary particle size distribution in a range of approximately 80 nm to approximately 199 nm and a density of at least approximately 6.6 g/cm$^3$.

In yet another embodiment, a method of forming a ceria material includes mixing an alkali base with an aqueous solution of cerium (III) nitrate, aging the mixture to form cerium oxide particles, washing the mixture to an ion conductivity of at least approximately 500 µS/cm, and calcining the cerium oxide particles at a temperature in a range of 650° C. to 1000° C.

BRIEF DESCRIPTION OF DRAWINGS

The present disclosure may be better understood, and its numerous features and advantages made apparent to those skilled in the art by referencing the accompanying drawings.

DETAILED DESCRIPTION

In a particular embodiment, a method of forming a cerium oxide particulate for use in an abrasive slurry includes mixing an alkali base with an aqueous solution of cerium nitrate, aging the mixture to form cerium oxide particulate, washing the mixture to provide an ion conductivity of at least approximately 500 µS/cm, drying and calcining the cerium oxide particles. In an example, the alkali base may include potassium hydroxide. In a further example, the ion conductivity may be at least approximately 1000 µS/cm. Calcining may be performed at a temperature in a range of approximately 650° C. to approximately 1000° C.

The resulting cerium oxide particulate may have desirable characteristics, in particular, for abrasive applications. For example, the cerium oxide particulate may have a primary particle size in a range of approximately 70 nm to approximately 120 nm. In another example, the cerium oxide particulate may have a secondary particle size in a range of approximately 80 nm to approximately 199 nm. Further, the cerium oxide particulate may have a density of at least approximately 6.6 g/cm$^3$.

According to one embodiment of the present disclosure, a cerium oxide abrasive material is formed through a precipitation process. For example, a base may be added to a solution including a cerium salt or a cerium salt may be added to a solution including a base. In particular, the solution may be an aqueous solution of cerium salt. An example of a cerium salt includes cerium nitrate, cerium chloride, cerium hydroxide, cerium carbonate, cerium sulfate, or a combination thereof. In a particular embodiment, the cerium (III) salt includes cerium nitrate.

While various bases may be used, processing typically involves mixing a metal hydroxide base with the aqueous solution of the cerium (III) salt. The metal hydroxide base may be a base formed from an alkali metal or a base formed from an alkali earth metal. In particular, an example of a metal hydroxide base includes potassium hydroxide (KOH), sodium hydroxide (NaOH), or a combination thereof. In an exemplary embodiment, potassium hydroxide is mixed with the aqueous solution of cerium nitrate.

In an embodiment, the mixture is aged. For example, the mixture may be stirred for a period of at least 8 hours, such as at least 12 hours, at least 16 hours, or even at least 24 hours. Aging may be performed at room temperature. Alternatively, aging may be performed a temperature of at least 80° C.

In addition, the mixture is washed to provide a desirable ion conductivity. Ion conductivity is typically determined by placing an ion-conductivity probe in the mixture. When an alkali metal base is used to precipitate cerium oxide, the ion-conductivity may indicate a level of remaining alkali metal ions, such as potassium ions. In particular, washing is performed to maintain at least a portion of the potassium ions. In an embodiment, the mixture can be washed to an ion conductivity of at least approximately 500 µS/cm. For example, the ion conductivity after washing may be at least approximately 800 µS/cm, such as at least approximately 1000 µS/cm, at least approximately 1100 µS/cm, or even at least approximately 1400 µS/cm. In particular, the conductivity may be at least approximately 1500 µS/cm, or even as high as 2500 µS/cm or higher. In general, the ion conductivity is not greater than approximately 3500 µS/cm, such as not greater than 3000 µS/cm.

Further, the mixture may be dried to obtain a particulate ceria material in the form of a powder. For example, the mixture can be dried using, for example, a spray drying, freeze drying, or pan drying process. In general, differing agglomeration characteristics may be achieved by selecting drying processes. For example, pan drying may be performed at a low temperature, such as approximately room temperature. Alternatively, pan drying may be performed at a higher temperature, such as at least about 100° C. In general, spray drying is performed at a temperature greater than 100° C., such as at least approximately 200° C. Freeze drying involves freezing the slurry to solid state and then heat it up to less than 100° C. under vacuum (~350 m torr), this process is known for producing less agglomerated powder.

The dried cerium oxide particulate is thermally treated, for example, using a calcining process at a temperature sufficient to promote crystal growth and increase density in the particulate ceria material. Typically, the heat treatment is carried out at a temperature of at least approximately 650° C., but not greater than approximately 1000° C. At temperatures less than approximately 650° C., desired crystal growth typically will not occur in the ceria material, while at temperatures greater than approximately 1000° C., the ceria particles may exhibit an angular shape that leads to polishing defects. In an embodiment, the calcining temperature may be in a range of approximately 700° C. to approximately 850° C. For instance, the calcining temperature may be in a range of approximately 750° C. to approximately 825° C.

In an embodiment, the calcined ceria material is wet-milled to obtain a desirable secondary cerium oxide particle size distribution. For example, the calcined ceria material may be wet with an aqueous solution and milled. The wet-milling process may be performed by adding up to 30 wt % of ceria powder to pH pre-adjusted deionized water. In an example, high purity $ZrO_2$ milling media of 0.3 to 0.4 mm may be used during milling. Slurry milling time is determined by the intended particle size distribution.

In addition, the ceria material may be subjected to an ion-exchange process to remove metal ions, such as the alkali metal ions. In an example, the ion-exchange process may include a fluidized-bed ion exchange process. Alternatively, a fixed-bed ion-exchange process may be used. The ceria material may also be filtered or concentrated.

In a particular embodiment, the ceria material may be combined into a slurry formulation. In an example, the slurry formulation is an aqueous slurry formulation. Alternatively, the slurry formulation may be an organic based slurry formulation. Further, the slurry formulation may include dispersants, biocides, and other additives. For example, the slurry formulation may include low molecular weight polymer additives, such as poly acrylate based additives. In another example, the slurry formulation may have a desirable pH, such as a pH greater than 5, or at least approximately 7. The pH may, for example, be manipulated using a base that does not include alkali or alkali earth metals, such as ammonium hydroxide.

In particular, the process described above provides cerium oxide particles, such as cerium (IV) oxide particles, having desirable characteristics. Such characteristics have surprisingly been found to produce abrasive slurries that produce both desirable surface characteristics and removal rates when used to polish surfaces, such as silica surfaces. For example, the cerium oxide particles have a primary particle size in a range of approximately 70 nm to approximately 120 nm. In some embodiments, the cerium oxide particles have a primary particle size in a range of approximately 70 nm to approximately 100 nm, such as a range of approximately 80 nm to approximately 100 nm.

As used herein, primary particle size is used to denote the average longest or length dimension of the particles. For example, when the cerium oxide particles exhibit a spherical or nearly spherical shape, particle size can be used to denote an average particle diameter. Average particle size can be determined by taking multiple representative samples and measuring the particle sizes found in representative sample images. Such sample images may be taken by various characterization techniques, such as by scanning electron microscopy (SEM). Particle size relates to individually identifiable particles.

Further, the cerium oxide particles may have a secondary particle size in a range of approximately 80 nm to approximately 199 nm. In an embodiment, the secondary particle size may be in a range of approximately 80 nm to approximately 175 nm, such as approximately 80 nm to approximately 149 nm. In particular, the secondary particle size may be in a range of approximately 140 nm to approximately 149 nm. Secondary particle size may be measured using a light scattering technique, such as the Horiba LA-920 laser particle size analyzer and the Malvern Zetasizer.

In addition to particle size, morphology of the ceria material may be further characterized in terms of specific surface area. Specific surface area can be obtained by gas adsorption using the Brunauer Emmett Teller (BET) method. According to embodiments herein, the ceria material includes cerium oxide particles having a specific surface area in a range of approximately 5 $m^2/g$ to approximately 15 $m^2/g$. In an embodiment, the cerium oxide particles may have a specific surface area in a range of approximately 6 $m^2/g$ to approximately 13 $m^2/g$, such as approximately 6 $m^2/g$ to approximately 10 $m^2/g$.

Further, the cerium oxide particles may have a density of at least approximately 6.6 $g/cm^3$. For example, the density may be at least approximately 7.0 $g/cm^3$. In an embodiment, the cerium oxide particles may have a density in a range of approximately 6.6 $g/cm^3$ to approximately 7.2 $g/cm^3$.

In a particular embodiment, secondary particle size can be determined through calculation, measurement, or a combination thereof. In general, secondary particle size is indicative of the extent of agglomeration or fusion of primary particles. For instance, secondary particle size can be calculated based on the BET specific surface area. In another example, secondary particle size can be measured using laser diffraction, such as using the Horiba LA-920 laser particle size analyzer. In particular circumstances, industry characterizes the ceria material in terms of a ratio of the size measured through laser scattering techniques to the size calculated from BET specific surface area. The cerium oxide material may exhibit a ratio less than 3.0, such as a ratio not greater than 2.5. In an example, the ratio is within a range of 1.0 to 3.0, such as 1.2 to 2.2.

Further, the cerium material may be characterized by the methods outlined by Kwon et al. (U.S. Pat. No. 7,090,821). As determined in accordance with the methods outlined in Kwon et al., the ceria material may have an $\alpha$ cohesive scale of at least about 2.0 and may have a $\beta$ cohesive scale not greater than 3.0.

In an exemplary embodiment, the resulting ceria material may include polycrystalline cerium oxide particles or a mixture of monocrystalline cerium oxide particles and polycrystalline cerium oxide particles. In an embodiment, the ratio of monocrystalline cerium oxide particles and polycrystalline cerium oxide particles is in a range of 1:9 to 9:1. For example, the ratio may be from 1:3 to 3:1. Alternatively, the ceria material may be predominantly polycrystalline.

Further, the ceria material is substantially free of lattice substituting impurities, such as titanium. For example, the ceria material may be at least 99.0 wt % cerium oxide, such as at least about 99.5 wt % cerium oxide, or even greater than 99.9 wt % cerium oxide.

In addition, the ceria material may have a desirable particle morphology. For example, the particles of the ceria material may be substantially rounded. "Rounded" denotes particles having an aspect ratio (e.g., a first dimension divided by a next longest dimension) of approximately 1 with the exception of cubes. In particular, the ceria material may have an average roundness, defined as the average ratio of dimensions for a set of particles, of not greater than 1.28, such as not greater than 1.24. For example, the average roundness may be not greater than 1.2, such as not greater than 1.15.

The above described ceria materials exhibit desirable characteristics, particularly in the context of abrasive slurries. In particular, the above described methods enable the formation of ceria materials having controlled properties that provide unexpected technical advantages over prior art ceria material when used in abrasive slurries.

Typically, the literature has focused on low density ceria materials. For example, Yoshida et al. (see, for example, U.S. Pat. No. 6,343,976, U.S. Pat. No. 6,863,700, and U.S. Pat. No. 7,115,021) disclose techniques for forming ceria particulate from fired cerium carbonate materials. Such techniques typically lead to low density porous materials, the use of which is advocated by Yoshida et al. While other literature references disclose precipitation of ceria materials (see, for example, U.S. Pat. No. 5,938,837 or U.S. Pat. No. 6,706,082), such literature references either disclose techniques that produce low density materials or that produce small particle size materials.

In contrast to the teachings of the literature, Applicants have discovered that higher density ceria materials of particular particle size provide for improved abrasive slurries. In particular, when such abrasive slurries are used to polish silica substrates, the abrasive slurries provide high removal rates and also provide polished surfaces with excellent surface finish. Furthermore, Applicants have discovered that use of particular process features, including firing of ceria materials in the presence of particular ions followed by wet-milling and ion exchange, provides ceria materials that when used in the context of abrasive slurries provide desirable polishing characteristics.

EXAMPLES

Example 1

An aqueous solution (20003 g) of 31.2% cerium (III) nitrate is titrated with 5000 g of a 30% ammonium hydroxide ($NH_4OH$) solution under strong agitation. The mixture is washed at room temperature and aged at 90° C. for 18 hours. The final ion conductivity is 8500 µS/cm. The mixture is thermally treated through autoclaving at a temperature of 220° C. The resulting cerium oxide particles are wet-milled at a solids loading up to 30 wt % in a pH range from 3.5 to 6 and filtered to produce a ceria material. The ceria material includes cerium oxide particles having a secondary particle size of 90 nm, a specific surface area of 70 $m^2$/g, and a density of 6.22 g/$cm^3$. The particle shape is spherical or nearly spherical and produces an excellent surface finish at a material removal rate (MRR) of 1000 Å/min.

Example 2

An aqueous solution (20003 g) of 31.2% cerium (III) nitrate is titrated with 5000 g of a 30% ammonium hydroxide ($NH_4OH$) solution under strong agitation. The mixture is aged at room temperature for 18 hours and is washed to an ion conductivity of approximately 570 µS/cm. The mixture is dried and is thermally treated through calcining in a box furnace at a temperature of 900° C. for 2 hours and allowed to cool to room temperature. The resulting cerium oxide particles are wet-milled at a solids loading up to 30 wt % in a pH range from 3.5 to 6 and are filtered to produce a ceria material. The ceria material includes cerium oxide particles having a secondary particle size of 99 nm, a specific surface area of 31.7 $m^2$/g, and a density of 6.82 g/$cm^3$. The particle shape is varied and produces an acceptable surface finish at a material removal rate (MRR) of 4200 Å/min.

Example 3

An aqueous solution (20003 g) of 31.2% cerium (III) nitrate is titrated with 5000 g of a 30% ammonium hydroxide ($NH_4OH$) solution under strong agitation. The mixture is aged at room temperature for 18 hours and washed to an ion conductivity of 6200 µS/cm. The mixture is dried and is thermally treated through calcining in a box furnace at a temperature of 900° C. for 2 hours and allowed to cool to room temperature. The resulting cerium oxide particles are wet-milled at a solids loading up to 30 wt % in a pH range from 3.5 to 6 and are filtered to produce a ceria material. The ceria material includes cerium oxide particles having a secondary particle size of 95 nm, a specific surface area of 32.5 $m^2$/g, and a density of 6.84 g/$cm^3$. The particle shape is varied and produces an acceptable surface finish at a material removal rate (MRR) of 4200 Å/min.

Example 4

An aqueous solution (20003 g) of 31.2% cerium (III) nitrate is titrated with 5000 g of a 30% ammonium hydroxide (NH$_4$OH) base solution. The mixture is aged at room temperature for 18 hours and is washed to an ion conductivity of 23,300 μS/cm. The mixture is dried and is thermally treated through calcining in a box furnace at a temperature of 1100° C. for 2 hours and allowed to cool to room temperature. The resulting cerium oxide particles are wet-milled at a solids loading up to 30 wt % in a pH range from 3.5 to 6 and are filtered to produce a ceria material. The ceria material includes cerium oxide particles having a secondary particle size of 97 nm, a specific surface area of 35.7 m$^2$/g, and a density of 6.71 g/cm$^3$. The particle shape is angular and produces a poor surface finish at a material removal rate (MRR) of 4000 Å/min.

Example 5

An aqueous solution of cerium (III) nitrate is precipitated with 22.5 wt % potassium hydroxide (KOH) base. The mixture is aged at room temperature for a period of 18 hours. The mixture is washed to an ion conductivity of 49 μS/cm. The mixture is dried and is thermally treated through calcining in a box furnace at a temperature of 845° C. for 2 hours and allowed to cool to room temperature. The ceria material includes cerium oxide particles having a secondary particle size of 99 nm, a specific surface area of 31.0 m$^2$/g, and a density of 6.78 g/cm$^3$. The particle shape is varied and produces an acceptable surface finish at a material removal rate (MRR) of 3700 Å/min.

Example 6

An aqueous solution of cerium (III) nitrate is precipitated with 22.5 wt % potassium hydroxide (KOH) base. The mixture is aged at room temperature for a period of 18 hours. The mixture is washed to an ion conductivity of 1120 μS/cm. The mixture is dried and is thermally treated through calcining in a box furnace at a temperature of 800° C. for 2 hours and allowed to cool to room temperature. The resulting cerium oxide particles are wet-milled at a solids loading up to 30 wt % in a pH range from 3.5 to 6 and are filtered to produce a ceria material. The ceria material includes cerium oxide particles having a secondary particle size of 143 nm, a specific surface area of 10.36 m$^2$/g, and a density of 7.13 g/cm$^3$. The particle shape is spherical or nearly spherical and produced an average surface finish at a material removal rate (MRR) of 2500 Å/min.

Example 7

An aqueous solution of cerium (III) nitrate is precipitated with 22.5 wt % potassium hydroxide (KOH) base. The mixture is aged at room temperature for a period of 18 hours. The mixture is washed to an ion conductivity of 1428 μS/cm. The mixture is dried and thermally treated through calcining in a box furnace at a temperature of 800° C. for 2 hours and allowed to cool to room temperature. The resulting cerium oxide particles are wet-milled at a solids loading up to 30 wt % in a pH range from 3.5 to 6. Subsequently, the cerium oxide is processed through ion exchange in a mixed-bed resin (cation to anion ratio=1) with a resin to ceria ratio=2:1. The resin is separated and discarded after 2 hours of ion-exchanging, and the cerium oxide particles are filtered to produce a ceria material. The ceria material includes cerium oxide particles having a secondary particle size of 197 nm, a specific surface area of 6.85 m$^2$/g, and a density of 6.76 g/cm$^3$. The particle shape is spherical or nearly spherical and produces a poor surface finish at a material removal rate (MRR) of 4050 Å/min.

Example 8

An aqueous solution of cerium (III) nitrate is precipitated with 22.5 wt % potassium hydroxide (KOH) base. The mixture is aged at room temperature for a period of 18 hours and is washed to an ion conductivity of 1428 μS/cm. The mixture is dried and is thermally treated through calcining in a box furnace at a temperature of 800° C. for 2 hours and allowed to cool to room temperature. The resulting cerium oxide particles are wet-milled at a solids loading up to 30 wt % in a pH range from 3.5 to 6. Subsequently, the cerium oxide is processed through ion exchange in a mixed-bed resin (cation to anion ratio=1) with a resin to ceria ratio=2:1. The resin is separated and discarded after 2 hours of ion-exchanging, and the cerium oxide particles are filtered to produce a ceria material. The ceria material includes cerium oxide particles having a secondary particle size of 186 nm, a specific surface area of 7.18 m$^2$/g, and a density of 6.81 g/cm$^3$. The particle shape is spherical or nearly spherical and produces an average surface finish at a material removal rate (MRR) of 4300 Å/min.

Example 9

An aqueous solution of cerium (III) nitrate is precipitated with 22.5 wt % potassium hydroxide (KOH) base. The mixture is aged for 18 hours and is washed to an ion conductivity of 1428 μS/cm. The mixture is dried and is thermally treated through calcining in a box furnace at a temperature of 800° C. for 2 hours and allowed to cool to room temperature. The resulting cerium oxide particles are wet-milled at a solids loading up to 30 wt % in a pH range from 3.5 to 6. Subsequently, the cerium oxide is processed through ion exchange in a mixed-bed resin (cation to anion ratio=1) with a resin to ceria ratio=2:1. The resin is separated and discarded after 2 hours of ion-exchanging, and the cerium oxide particles are filtered to produce a ceria material. The ceria material includes cerium oxide particles having a secondary particle size of 164 nm, a specific surface area of 6.48 m$^2$/g, and a density of 6.83 g/cm$^3$. The particle shape is spherical or nearly spherical and produces a good surface finish at a material removal rate (MRR) of 4300 Å/min.

Example 10

An aqueous solution of cerium (III) nitrate is precipitated with 22.5 wt % potassium hydroxide (KOH) base. The mixture is aged at room temperature for a period of 18 hours and is washed to an ion conductivity of 1428 μS/cm. The mixture is dried and is thermally treated through calcining in a box furnace at a temperature of 800° C. for 2 hours and allowed to cool to room temperature. The resulting cerium oxide particles are wet-milled at a solids loading up to 30 wt % in a pH range from 3.5 to 6. Subsequently, the cerium oxide is processed through ion exchange in a mixed-bed resin (cation to anion ratio=1) with a resin to ceria ratio=2:1. The resin is separated and discarded after 2 hours of ion-exchanging, and the cerium oxide particles are filtered to produce a ceria material. The ceria material includes cerium oxide particles having a secondary particle size of 148 nm, a specific surface area of 6.94 m$^2$/g, and a density of 7.04 g/cm$^3$. The particle shape is spherical or nearly spherical and produces an excellent surface finish at a material removal rate (MRR) of 4800 Å/min.

Example 11

An aqueous solution of cerium (III) nitrate is precipitated with 22.5 wt % potassium hydroxide (KOH) base. The mixture is aged at room temperature for a period of 18 hours and is washed to an ion conductivity of 887 μS/cm. The mixture is dried and is thermally treated through calcining in a box furnace at a temperature of 800° C. for 2 hours and allowed to cool to room temperature. The resulting cerium oxide particles are wet-milled at a solids loading up to 30 wt % in a pH range from 3.5 to 6. Subsequently, the cerium oxide is processed through ion exchange in a mixed-bed resin (cation to anion ratio=1) with a resin to ceria ratio=2:1. The resin is separated and discarded after 2 hours of ion-exchanging, and the cerium oxide particles are filtered to produce a ceria material. The ceria material includes cerium oxide particles having a secondary particle size of 146 nm, a specific surface area of 12.11 m$^2$/g, and a density of 7.14 g/cm$^3$. The particle shape is spherical or nearly spherical and produces an excellent surface finish at a material removal rate (MRR) of 4700 Å/min.

Example 12

An aqueous solution of cerium (III) nitrate is precipitated with 22.5 wt % potassium hydroxide (KOH) base. The mixture is aged at room temperature for a period of 18 hours and is washed to an ion conductivity of 1120 μS/cm. The mixture is dried and is thermally treated through calcining in a box furnace at a temperature of 800° C. for 2 hours and allowed to cool to room temperature. The resulting cerium oxide particles are wet-milled at a solids loading up to 30 wt % in a pH range from 3.5 to 6. Subsequently, the cerium oxide is processed through ion exchange in a mixed-bed resin (cation to anion ratio=1) with a resin to ceria ratio=2:1. The resin is separated and discarded after 2 hours of ion-exchanging, and the cerium oxide particles are filtered to produce a ceria material. The ceria material includes cerium oxide particles having a secondary particle size of 143 nm, a specific surface area of 9.29 m$^2$/g, and a density of 7.11 g/cm$^3$. The particle shape is spherical or nearly spherical and produces an excellent surface finish at a material removal rate (MRR) of 4700 Å/min.

Table 1, below, provides a summary of processing conditions. Table 2 illustrates characteristics of cerium oxide particles, such as secondary particle sizes, specific surface areas, density, particle shape, and polishing features, resulting from formation processes.

TABLE 1

Process Conditions

| Example | Titrating Base | Conductivity - Prior to thermal treatment (μS/cm) | Thermal Treatment Temp (° C.) | Ion Exchange (y/n) |
|---|---|---|---|---|
| Example 1 | NH4OH | 8500 | 220 | N |
| Example 2 | NH4OH | 570 | 900 | N |
| Example 3 | NH4OH | 6200 | 900 | N |
| Example 4 | NH4OH | 23300 | 1100 | N |
| Example 5 | KOH | 49 | 845 | N |
| Example 6 | KOH | 1120 | 800 | N |
| Example 7 | KOH | 1428 | 800 | Y |
| Example 8 | KOH | 1428 | 800 | Y |
| Example 9 | KOH | 1428 | 800 | Y |
| Example 10 | KOH | 1428 | 800 | Y |
| Example 11 | KOH | 887 | 800 | Y |
| Example 12 | KOH | 1120 | 800 | Y |

TABLE 2

Particle Characteristics and Polishing Performance

| Example | Secondary PSD (nm) | SSA (m$^2$/g) | Density (g/cc) | Particle Shape | MRR (Å/min) | Surface Finish |
|---|---|---|---|---|---|---|
| Example 1 | 90 | 70.0 | 6.22 | Roundish | 1000 | Excellent |
| Example 2 | 99 | 31.7 | 6.82 | Varied | 4200 | Good |
| Example 3 | 95 | 32.5 | 6.84 | Varied | 4200 | Good |
| Example 4 | 97 | 35.7 | 6.71 | Angular | 4000 | Poor |
| Example 5 | 99 | 31.0 | 6.78 | Varied | 3700 | Good |
| Example 6 | 143 | 10.36 | 7.13 | Roundish | 2500 | Average |
| Example 7 | 197 | 6.85 | 6.76 | Roundish | 4050 | Poor |
| Example 8 | 186 | 7.18 | 6.81 | Roundish | 4300 | Average |
| Example 9 | 164 | 6.48 | 6.83 | Roundish | 4300 | Good |
| Example 10 | 148 | 6.94 | 7.04 | Roundish | 4800 | Excellent |
| Example 11 | 146 | 12.11 | 7.14 | Roundish | 4700 | Excellent |
| Example 12 | 143 | 9.29 | 7.11 | Roundish | 4700 | Excellent |

Polishing performance is determined through testing a sample slurry in a Chemical Mechanical Planarization (CMP) process. Chemical Mechanical Planarization (CMP) is performed using a IPEC 372 polishing tool and a K-grooved IC 1400 polishing pad. The wafer carrier speed is set at 40 rpm with a table speed of 45 rpm. The ceria slurry flow rate is 125 mL/min and solid loading of ceria is 1.2%. The test is performed on an 8" PETEOS wafer for 60 seconds. Removal rate is calculated based on the weight loss of the wafer.

As illustrated in Example 1, precipitation of cerium oxide and thermal treatment at temperatures below 600° C. provides a low density ceria material that has poor material removal rates (MRR). However, as illustrated in Examples 2, 3, and 4, increasing the temperature of the heat treatment increases the MRR, but decreases the quality of the polished surface.

In Examples 5 through 12, potassium hydroxide is used to precipitate cerium oxide. In general, Applicants surprisingly found that using potassium hydroxide permits lower calcining temperatures than using ammonium hydroxide. In addition, Applicants surprisingly found that the potassium hydroxide influences particle growth and polishing performance.

In Example 5, the potassium of the potassium hydroxide is washed away to a low ion conductivity prior to drying and calcining. The resulting material exhibits reasonable MRR and good surface quality. In Example 6, the ion conductivity is maintained above 1000 µS/cm prior to drying and calcining, but the potassium ion remains in the final particulate material. The resulting material exhibits a reduced MRR and produces a worse surface finish relative to Example 5.

In contrast, Examples 7 through 12 maintain ion conductivity greater than 500 µS/cm prior to heat treatment, heat treat at a temperature greater than 650° C., and perform ion exchange on the resulting powder. Each of the Examples 7 through 12 exhibit significantly improved MRR relative to Examples 5 and 6.

While Examples 7 through 9 exhibit desirable MRR, the ceria materials of these examples produce lower quality surface finishes. In contrast, Examples 10 through 12 exhibit even higher MRR and provide excellent surface finish. Applicants attribute the surface finishing difference to smaller secondary particle size distribution and greater density.

Example 13

In particular, Applicants discovered that particular combinations of ion conductivity, calcining temperature, wet-milling, and ion exchange processing can be used to promote crystal growth in the ceria material and provide desirable abrasive performance.

Figure 1:
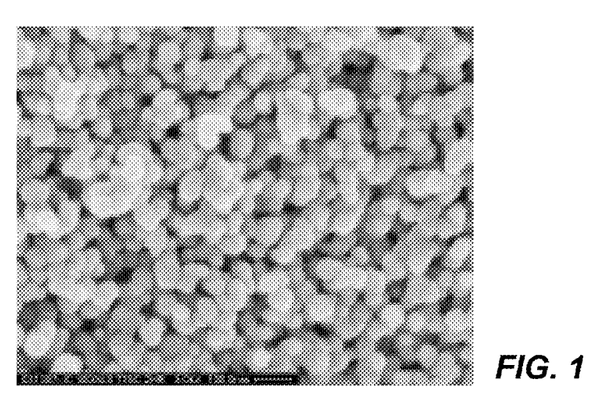
FIG. 1, FIG. 2, FIG. 3, FIG. 4, FIG. 5, FIG. 6, FIG. 7, FIG. 8, and FIG. 9 include images of particles produced using different process parameters.
Figure 2:
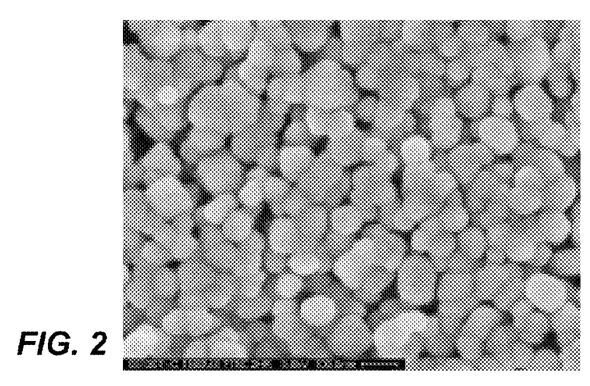
Figure 3:
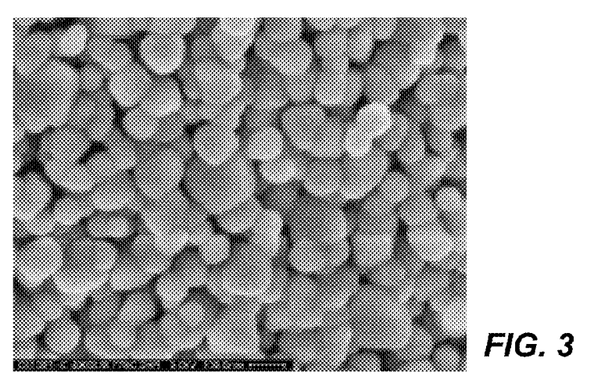

For instance, FIG. 1, FIG. 2 and FIG. 3 illustrate SEM images of particles treated at a calcining temperature of approximately 775° C. and with ion conductivities of 1000 µS/cm, 1500 µS/cm, and 2500 µS/cm, respectively. In general, particle size increases with increased ion conductivity. The particles of FIG. 1 have an average particle size of about 63.0 nm, the particles of FIG. 2 have an average particle size of about 93.5 nm, and the particles of FIG. 3 have an average particle size of about 103.8 nm. The average is determined based on the average diameter of at least 5 representative particles.

Figure 4:
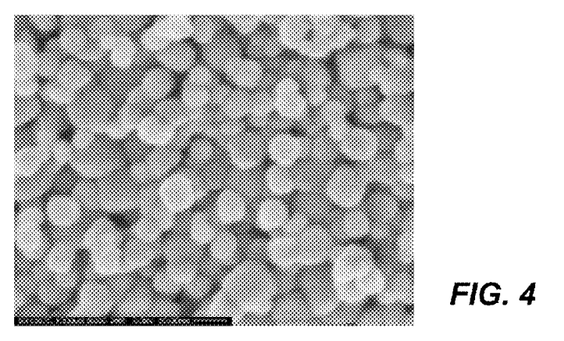
Figure 5:
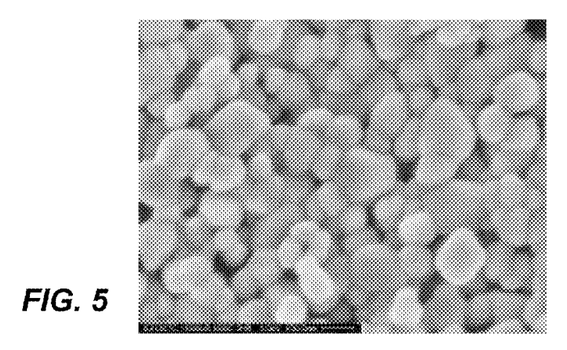
Figure 6:
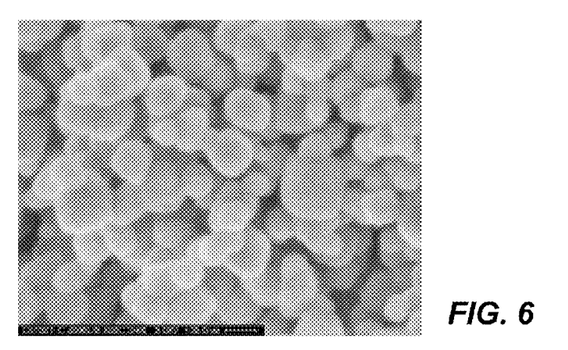
Figure 7:
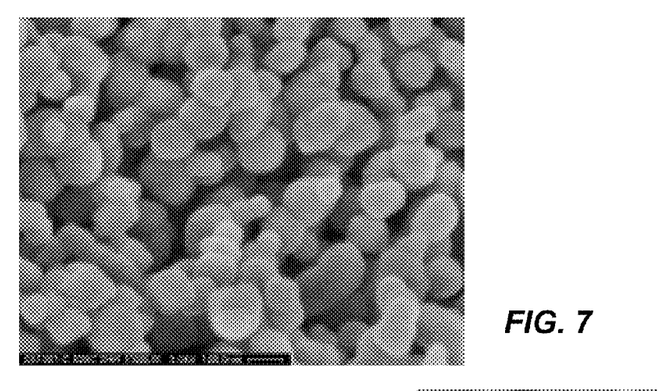
Figure 8:
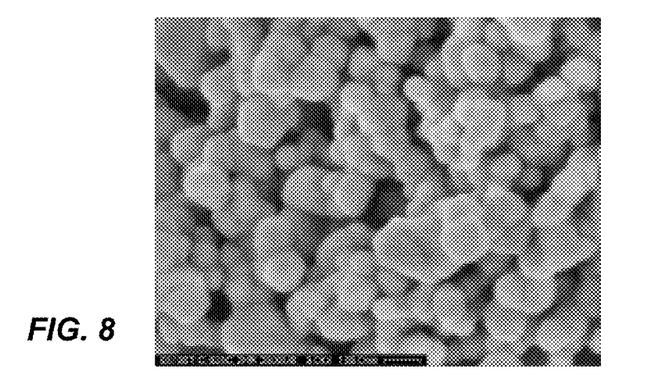
Figure 9:
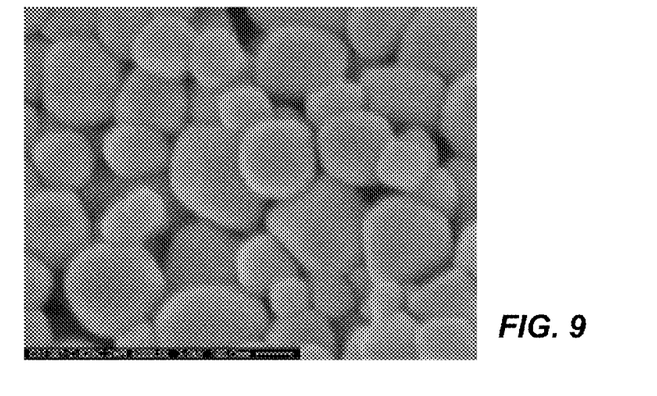

In another example, FIG. 4, FIG. 5, and FIG. 6 illustrate SEM images of particles treated at a calcining temperature of approximately 800° C. and ion conductivities of 1000 µS/cm, 1500 µS/cm, and 2500 µS/cm, respectively. The particles of FIG. 4 have an average particle size of about 102.8 nm, the particles of FIG. 5 have an average particle size of about 110.0 nm, and the particles of FIG. 6 have an average particle size of about 126.0 nm. In yet another example, FIG. 7, FIG. 8 and FIG. 9 illustrate SEM images of particles treated at a calcining temperature of approximately 825° C. and ion conductivities of 1000 µS/cm, 1500 µS/cm, and 2500 µS/cm, respectively. The particles of FIG. 7 have an average particle size of about 113.8 nm, the particles of FIG. 8 have an average particle size of about 114.3 nm, and the particles of FIG. 9 have an average particle size of about 196.8 nm.

As is illustrated in FIGS. 1 through 9, combinations of ion conductivity and calcining temperatures can be used to manipulate particle growth to produce particles of desirable characteristics and morphology and, in particular, particles useful for forming abrasive slurries that exhibit desirable performance. In particular, for a given ionic conductivity, a 50° C. increase in calcining temperature results in an increase of at least 20% in average particle size, such as an increase of at least 50%, or even as high as 80%. A Growth Index is defined as the percent increase in average particle size resulting from a 50° C. change in temperature when the starting temperature is in a range of 750° C. to 800° C. Accordingly, the cerium oxide powders that produce the particles of FIGS. 1 to 9 have a Growth Index of at least about 20, such as at least about 50, or even at least about 80. For a given calcining temperature, a 1500 µS/cm increase in ion conductivity may result in an increase of at least 20% in average particle size, such as at least 40%, or even as high as 60%. The combined result of a 50° C. increase and a 1500 µS/cm increase may provide a 200% increase in particle size.

Further, the morphology of the particles is generally round. For example, the particles of FIG. 7 have a mean roundness of 1.17 and a max roundness of 1.5. The particles illustrated in FIG. 9 have mean roundness of 1.12 and a max roundness of 1.4. Roundness is the average ratio of a dimension to the next longest dimension.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciated that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. A particulate material comprising cerium oxide particles having a secondary particle size distribution in a range of 80 nm to 199 nm and a density of at least 6.6 g/cm$^3$.

2. The particulate material of claim 1, wherein the cerium oxide particles have a primary particle size in a range of 70 nm to 120 nm.

3. The particulate material of claim 1, wherein the secondary particle size distribution is in a range of 80 nm to 149 nm.

4. The particulate material of claim 3, wherein the secondary particle size distribution is in a range of 140 nm to 149 nm.

5. The particulate material of claim 1, wherein the density is at least 7.0 g/cm$^3$.

6. The particulate material of claim 1, wherein the density is in a range of 6.6 g/cm$^3$ to 7.2 g/cm$^3$.

7. The particulate material of claim 1, wherein the cerium oxide particles have a specific surface area in a range of 5 m$^2$/g to 15 m$^2$/g.

8. The particulate material of claim 1, wherein a ratio of a calculated secondary particle size of the cerium oxide particles to the secondary particle size distribution of the cerium oxide particles is in a range of 1.0 to 3.0.

9. The particulate material of claim 1, wherein the particulate material has a Roundness of not greater than 1.28.

10. The particulate material of claim 9, wherein the Roundness is not greater than 1.24.

11. A particulate material comprising polycrystalline cerium oxide particles having a secondary particle size distribution in a range of 90 nm to 199 nm and a density in a range of 6.6 g/cm$^3$ to 7.2 g/cm$^3$.

* * * * *